United States Patent [19]

Nott

[11] 3,937,632

[45] Feb. 10, 1976

[54] METHOD FOR BRIGHTENING AND WHITENING CLAYS UTILIZING SODIUM BOROHYDRIDE

[75] Inventor: Alan J. Nott, Tennille, Ga.

[73] Assignee: Anglo-American Clays Corporation, Sandersville, Ga.

[22] Filed: June 11, 1974

[21] Appl. No.: 478,352

[52] U.S. Cl. ............... 106/72; 106/288 B; 252/186; 252/188; 423/111; 423/130
[51] Int. Cl.² ...................... C04B 33/13; C01F 1/00
[58] Field of Search ............... 106/72, 71, 67, 288 R, 106/288 B; 423/111, 119, 130, 131; 252/186, 188

[56] References Cited

UNITED STATES PATENTS

| | | | |
|---|---|---|---|
| 2,339,594 | 1/1944 | Williams | 106/72 |
| 2,920,832 | 1/1960 | Duke | 106/72 |
| 3,193,344 | 7/1965 | Iannicelli et al. | 106/72 |
| 3,290,161 | 12/1966 | Sheldon et al. | 106/72 |
| 3,353,668 | 11/1967 | Duke | 106/72 |
| 3,666,513 | 5/1972 | Malden | 106/288 B |

*Primary Examiner*—Walter R. Satterfield
*Attorney, Agent, or Firm*—Stefan J. Klauber, Esq.

[57] ABSTRACT

A method for improving the brightness and whiteness of kaolin clays or the like. An aqueous slurry of the clay is initially treated with a solution of sodium borohydride and sodium hydroxide at a pH of above 7.0 up to about 10.0. Sulphur dioxide is then bubbled through the slurry or otherwise brought into contact with same, the pH being permitted to attain a value of between 6.0 and 7.0. The pH may thereupon be adjusted to between 2.5 and 4.0 with an acid, at which pH the leach reaction may occur; or the application of gaseous sulphur dioxide may be continued to yield a pH of the indicated 2.5 to 4.0 range.

5 Claims, No Drawings

METHOD FOR BRIGHTENING AND WHITENING CLAYS UTILIZING SODIUM BOROHYDRIDE

BACKGROUND OF THE INVENTION

This invention relates generally to clay processing, and more specifically relates to methods for increasing the brightness and whiteness of kaolin clays.

The commercial value of a refined kaolin is in good part a function of the brightness and whiteness of the product obtained from the refining processes to which a crude kaolin is commonly subjected in the course of yielding an end product. One of the principal sources of discoloring contaminants in the crude clay takes the form of insoluble oxides of iron. Thus a commonly used technique for removing the said contaminants involves forming the clay into an aqueous slurry, acidifying the slurry to a pH of the order of 3.0 to 4.0, and adding a slurry-soluble salt of hydrosulfurous acid. The general objective of this operation is to provide $S_2O_4^=$ion which acts as a reductive leaching agent. In particular such ion functions to reduce the ferric compounds present in the slurry to ferrous form, the latter being readily soluble and therefore removable by subsequent washing, dewatering, and filtering operations.

In the past zinc or sodium salts of hydrosulfurous acid have represented the most common materials used for the aforementioned leaching purposes. Both of these salts, however, have distinct disadvantages. While zinc hydrosulfite, for example, is highly effective for the leaching operation, its use results in waste water discharge displaying unacceptably high content of zinc ion. Similarly its use results in residual zinc ion in the processed clay, the actual residual content being a function of the efficiency of the thickening and washing process. Where such clays are later utilized in certain paper mill operations, the mill discharge water can contain zinc ion levels sufficiently high to endanger certain of the animal species in the streams or rivers into which such water passes.

The residual zinc ion and associated salts present in the treated clay can, further, result in poor rheological behavior of the clays. In particular, the effect can manifest itself through high initial Brookfield viscosities, and in highly unstable slurries. Thickening of the slurries arising from such cause is undesirable, in that the clay manufacturer often desires to ship in slurry form; and, secondly, the consumer of the materials may desire to store the clay as a slurry — even where it is initially provided to him in a dry state.

The toxicity and rheological problems associated with zinc are obviated by use of sodium hydrosulfite. However, the latter compound is unstable, is possibly less effective in use than corresponding zinc compounds, and is furthermore in relatively short supply.

It may be noted in this connection that within recent years, a process utilizing sodium borohydride for production of sodium hydrosulfite has found favor in various applications — including bleaching applications. One of these processes, for example, the "Borol" process (a trademark of Ventron Corp., Beverly, Mass.) uses a solution including sodium borohydride and sodium hydroxide. Sulphur dioxide gas is made to react with the Borol solution in a special reaction chamber, to produce liquid sodium hydrosulfite.

In the usual technique employed with Borol and similar solutions, the components are reacted to produce the hydrosulfite, which is then stored for later use. As already suggested, however, storage of liquid sodium hydrosulfite is undesirable because of decomposition taking place due to the effect of temperature, pH, inadvertent aeration, and self-decomposition resulting from the presence of impurities — such as bisulfites produced during the generation reaction. Indeed in a typical instance it has been found that a sodium hydrosulfite solution produced from powder and having an initial 15.4% concentration of the hydrosulfite, will decompose approximately 35% in five days when maintained at 30°C. At 35°C the decomposition will amount to almost 50% in only 3 days. Furthermore, during transfer of the sodium hydrosulfite to the reaction vessel in which leaching is to occur, and during addition and subsequent mixing, further decomposition can occur, in accordance with one or more of the following equations:

a. $2Na_2S_2O_4 + H_2O \rightarrow Na_2S_2O_3 + 2NaHSO_3$
b. $2Na_2S_2O_4 \xrightarrow{H} Na_2S_2O_5 + Na_2S_2O_3$
c. $Na_2S_2O_4 \xrightarrow{H} NaOH + 2H_2SO_2$
d. $2H_2SO_2 \rightarrow HSOH + H_2SO_3$
e. $HSOH \rightarrow$ various products
f. $Na_2S_2O_4 \xrightarrow{[O]} 2NaHSO_3$ Thus reaction (f) above, becomes particularly pertinent in that air-derived oxygen present in the clay stream and introduced during the mixing is very detrimental, leading to a rapid decomposition to sodium bisulfite. Also of considerable pertinence for present purposes are reactions (b) and (c), which show the dramatic effect of pH. The lower the pH, in particular, the more rapid decomposition, so that at a pH of 0.8, for example, sodium hydrosulfite solutions have a half life of approximately 2 minutes at 25°C.

In an attempt to eliminate the problem of advance preparation of sodium hydrosulfite solutions, it has been proposed in British Pat. No. 1,039,960, to initially treat an aqueous clay slurry with a water soluble sulfite, hydrogen sulfite or disulfite, and/or sulphur dioxide, or sulfurous acid. The said patent goes on to prescribe that an alkali metal borohydride be subsequently added to the slurry, after which the pH is adjusted to a value between 2.5 and 4. A primary difficulty with this approach is that the very addition of the aforementioned sulfites, and particularly of sulphur dioxide, lowers the pH in the slurry so that conditions favorable to decomposition of hydrosulfites are present before, in fact, the borohydride reactant is added.

A related teaching is found in U.S. Pat. No. 3,290,161 to Fred R. Sheldon et al. Sheldon thus teaches that initially one adds to an aqueous clay slurry an alkali bisulfite at a pH of about 3 to 3.5, and subsequently adds a borohydride to the treated slurry. Again in this instance, the initially acidic conditions favor decomposition.

SUMMARY OF INVENTION

Now in accordance with the principles of the present invention, it has unexpectedly been found that outstanding leaching of impurities contained in aqueous slurries of kaolin clay or the like, may be effected by a sequential operation, according to which the clay slurry is initially treated with sodium borohydride and sodium hydroxide, followed by a subsequent step wherein the slurry is treated with sulphur dioxide gas or a sulfuric acid solution. In a preferable procedure, the slurry is admixed at a pH of above 7.0 and up to about 10.0, with the calculated amount of sodium borohydride and sodium hydroxide that will yield the desired quantity of sodium hydrosulfite leaching agent. Sulphur dioxide is then bubbled through the slurry, or otherwise made to contact same. During this last step the pH is permitted to attain a value of between 6.0 and 7.0, which pH favors maximum formation of sodium hydrosulfite in situ — i.e. within the body of the slurry. The pH is subsequently adjusted to between 2.5 and 4.0, e.g. with an acid such as sulfuric acid, at which pH the leach (i.e. reduction) reaction may occur. Alternatively, following completion of sodium hydrosulfite generation, (as evidenced by attainment of the cited pH range of 6.0 to 7.0) the application of gaseous sulphur dioxide may be continued to yield a pH of the indicated 2.5 to 4.0 range, at which range the leach reaction occurs.

DESCRIPTION OF PREFERRED EMBODIMENT

EXAMPLE I

In order to illustrate the efficacy of the present method, a Middle Georgia soft kaolin clay sample was dispersed as an aqueous slurry containing 26.0% solids. The said sample had been previously derived from a crude kaolin which was subjected to a standard beneficiation treatment by froth floatation. In consequence the said sample had an initial G.E. brightness of 85.6 and Whiteness Index of 7.2. The aqueous slurry, at a pH of 8.5, was initially treated with sufficient sodium borohydride and sodium hydroxide, to yield the equivalent of 6 lbs./ton of sodium hydrosulfite, assuming 100% yield of leach reagent. The slurry at 25°C was pumped into a bubble contactor where $SO_2$ was added to bring the pH to 7.0. Thereafter, sulfuric acid was added to adjust the final pH to 3.0, at which pH the well-known leaching reaction occurs, reducing the ferric compounds to corresponding ferrous forms. The results of this leaching reaction were compared with those obtained where commercial sodium hydrosulfite in powdered form was added to the slurry to give an equivalent of 6 lbs./ton, a final pH of 3.0, and at 25°C. The pH in this latter instance was also adjusted with sulfuric acid. It was found that the sample treated with borohydride and sodium hydroxide, followed by $SO_2$, exhibited (after washing and dewatering) a G.E. Brightness value of 89.8, and a Whiteness Index of 3.2. The sample treated with commercial hydrosulfite powder exhibited a G.E. Brightness of 89.7 and a Whiteness Index of 3.5.

In this Example, as well as in the ensuing Examples and Table I, it will be understood that "G.E. Brightness" refers to values obtained according to the standard specification established by TAPPI Procedure T-646m-54. This method measures the light reflectance of a clay sample of 457 millimicrons, and thus gives a quantative indication of its brightness. The "Whiteness Index" is a value obtained by subtracting the reflectance reading at 400 millimicrons from the reflectance reading at 700 millimicrons, such Index thereby providing a quantative indication of the whiteness of the sample.

The preferred temperature for the leach reaction of the invention, as illustrated in this Example, is between about 25° to 45°C. At lower temperatures the reaction is slow, and at higher temperatures the decomposition of sodium hydrosulfite begins to become excessive.

Example II

In this Example, conditions were identical to those described in Example I, except that the addition of sulphur dioxide to the borohydride-treated clay slurry was permitted to continue beyond the point (pH of 6.0 to 7.0) at which the hydrosulfite is formed, until a pH of 3.0 was reached. Thus no subsequent correction with sulphuric acid was required. Under these conditions, the resultant sample was found (after washing to remove residual hydrosulfites and reactants, and dewatering) to have a G.E. Brightness value of 89.7, and a Whiteness Index of 3.3. In this Example, as well as in all other data correlated in the Examples herein and in the Table I below, the brightness of a sample obtained from feed slurry, that is without leaching, was found to be 85.6 on the G.E. scale, and the Whiteness Index was 7.2.

In Table I hereinbelow, further data is set forth, which compares the resultant brightness and whiteness of clay samples obtained using various leach levels, and with four different methods of leach application — including that of the present invention. In each instance the numerical values tabularized represent the G.E. Brightness value as previously mentioned, and the Whiteness Index for the resultant sample. The four methods considered in Table I are thus: treatment with zinc hydrosulfite powder; treatment with sodium hydrosulfite powder; treatment with hydrosulfite liquid; and finally, treatment with sodium hydrosulfite formed in situ, in accordance with the principles of the invention. It should be noted that in the case of the sodium hydrosulfite liquid the product is produced by the so-called Borol process, alluded-to in the "Background" portion of this specification, i.e. by reaction of Borol solution and sulphur dioxide in a reactor vessel, after which the resultant liquid is added in appropriate amounts.

Table I

| | Leached Brightness and Whiteness (Brightness/Whiteness) Resulting at Various Leach Levels with Different Methods | | | | | |
|---|---|---|---|---|---|---|
| lbs./ton equivalent | 2 | 4 | 6 | 8 | 10 | 12 |
| *1 Zinc hydrosulphite powder | 87.7/4.8 | 89.4/3.7 | 89.6/3.0 | 89.7/3.1 | 89.7/3.2 | 89.7/3.1 |
| *2 Sodium hydrosulphite powder | 87.4/4.9 | 89.4/3.8 | 89.7/3/5 | 89.7/3.5 | 89.7/3.5 | 89.7/3.5 |
| *3 Sodium Hydrosulphite liquid | 87.1/4.8 | 89.5/3.7 | 89.7/3.0 | 88.8/3.0 | 89.8/3.1 | 89.8/3.1 |
| *4 Sodium hydrosulphite "in situ" | 87.9/3.6 | 89.6/3.5 | 89.8/3.0 | 89.9/2.8 | 89.9/2.7 | 90.0/2.8 |

*1 Zinc hydrosulphite supplied by Rohm & Haas, Inc.
*2 Sodium hydrosulphite, K-Brite 3, supplied by Virginia Chemicals.
*3 Sodium hydrosulphite liquid produced from Borol and sulphur dioxide in a laboratory reactor. Added in amounts appropriate to yield the cited equivalent quantity in lbs./ton of sodium hydrosulphite.
*4 Sodium hydrosulphite produced by bubbling sulphur dioxide into the clay slurry containing the appropriate amount of sodium borohydride, and NaOH to yield the cited equivalent quantity of sodium hydrosulphite.

Continuing to refer to Table I, the method 4, that is the method in accordance with the invention, in each instance included bubbling sulphur dioxide through the clay slurry sample (as in Example I above — the data of Example is incorporated into Table I), until the pH of the slurry attains a value of 7.0. At this point the reaction forming the hydrosulfite is regarded as completed. The pH was then adjusted to 3.0 by addition of sulfuric acid. The clay slurry, in all instances, is that described in connection with Example I, and thus included 26% solids content. More generally the method of the invention is applicable with slurries including solids contents up to about 30 to 35% — the principal problem determining the upper limit of solids being one of difficulty in adding sulphur dioxide as the viscosity of the slurry becomes higher. The data in Table I was all derived at the previously-cited temperature of 25°C.

The basic reaction of the present process is in accordance with the equation:

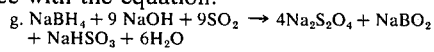

Sodium borohydride is available as a solution containing all the sodium hydroxide necessary for the reaction shown in equation (g) to proceed; however, the said material is also commercially available with only 3.4 "units" of NaOH present, necessitating addition of a further 5.6 units of NaOH. This latter practice is preferred commercially, as it eliminates the necessity for conveying sodium hydroxide over long distances. The appropriate amount of that inexpensive NaOH, may instead, be added at the site of use. The previously mentioned Borol solution for example, includes about 12% by weight of $NaBH_4$ and 42% by weight NaOH (in aqueous solution). Addition of the further 5.6 units in this instance thus represents adding NaOH in a quantity which is about 71% by weight of the original Borol solution.

It will be noted in reviewing the contents of Table I, that at all concentration levels of leach addition, superior brightness data is yielded where the method of the present invention is practiced. It is not fully understood exactly why the method of the invention should, in virtually all instances, yield superior results in comparison to equal levels of leach addition yielded by other methods; but it is hypothesized that the method of the invention enables virtually 100% yield and utilization of the hydrosulfite as that compound is formed in situ in the slurry. In particular it will be appreciated that, in accordance with the invention, the hydrosulfite is, firstly, formed at a pH of 6 to 7, at which maximum yield is believed to occur. At the same time, virtually no instability of the developing hydrosulfite occurs under these conditions. As the pH is thereafter adjusted to a lower value — by further bubbling of $SO_2$ into solution, or by addition of sulfuric or other acid — the hydrosulfite (which is in situ) is immediately utilized. It may, further be noted in this connection that one of the incidental (but important) advantages of the present "in situ" reaction, is that the heat generated by reaction is rapidly and effectively dissipated in the slurry. This contrasts to the serious heating problems which can occur when sodium hydrosulfite is generated externally — e.g. by the aforementioned Borol process.

The method of sulphur dioxide addition to the clay slurries is also deemed to be a factor in the high rate of efficiency observed in accordance with the invention. As already indicated, a preferred method is to bubble the $SO_2$ through the slurry, for which purposes a sparger or other known gas distributing means may be positioned beneath the surface of the slurry. Similarly, however, gas-liquid contact means, including packed towers, may be utilized in the process of the invention. Since the borohydride is in any event already present in the solution, the $SO_2$, either where bubbled through the slurry or where diffused to the liquid phase by countercurrent contact in a packed tower or the like, is instantly able to react with the borohydride, which is deemed an important factor in the high utilization rate obtained.

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly the invention is to be broadly construed, and limited only by the scope and spirit of the claims now appended hereto.

We claim:

1. A method for brightening and whitening a kaolin clay comprising in sequence the steps of:
   forming said clay into an aqueous slurry;
   mixing said aqueous slurry with a solution of sodium borohydride and sodium hydroxide, while maintaining a pH of above 7.0 and up to about 10.0;
   contacting said slurry with gaseous sulphur dioxide in sufficient quantities to bring said slurry to a pH of between 6.0 and 7.0; said sulphur dioxide reacting with said sodium borohydride and sodium hydroxide to yield sodium hydrosulfite, and the quantities of said sodium borohydride and said sodium hydroxide being sufficient to yield a reacted equivalent of between 2 and 12 lbs/ton of slurry, of sodium hydrosulfite;
   adjusting the pH of the slurry to between 2.5 and 4.0, to facilitate said leach reaction;
   the temperature of the system being maintained within the range of 25° to 45°C; and
   washing the clay free of residual leaching agents and reaction products.

2. A method in accordance with claim 1, wherein said pH is adjusted to said 2.5 to 4.0 range by continuing application of said sulphur dioxide.

3. A method in accordance with claim 1, wherein said pH is adjusted to said 2.5 to 4.0 range by addition of a further acid to said slurry.

4. A method in accordance with claim 1, wherein said sulphur dioxide is bubbled through said slurry to effect said reaction.

5. A method in accordance with claim 1, wherein said sulphur dioxide is diffused into said slurry by passing said slurry through a packed tower in countercurrent relation to flow of said sulphur dioxide.

* * * * *